United States Patent Office 3,401,424
Patented Sept. 17, 1968

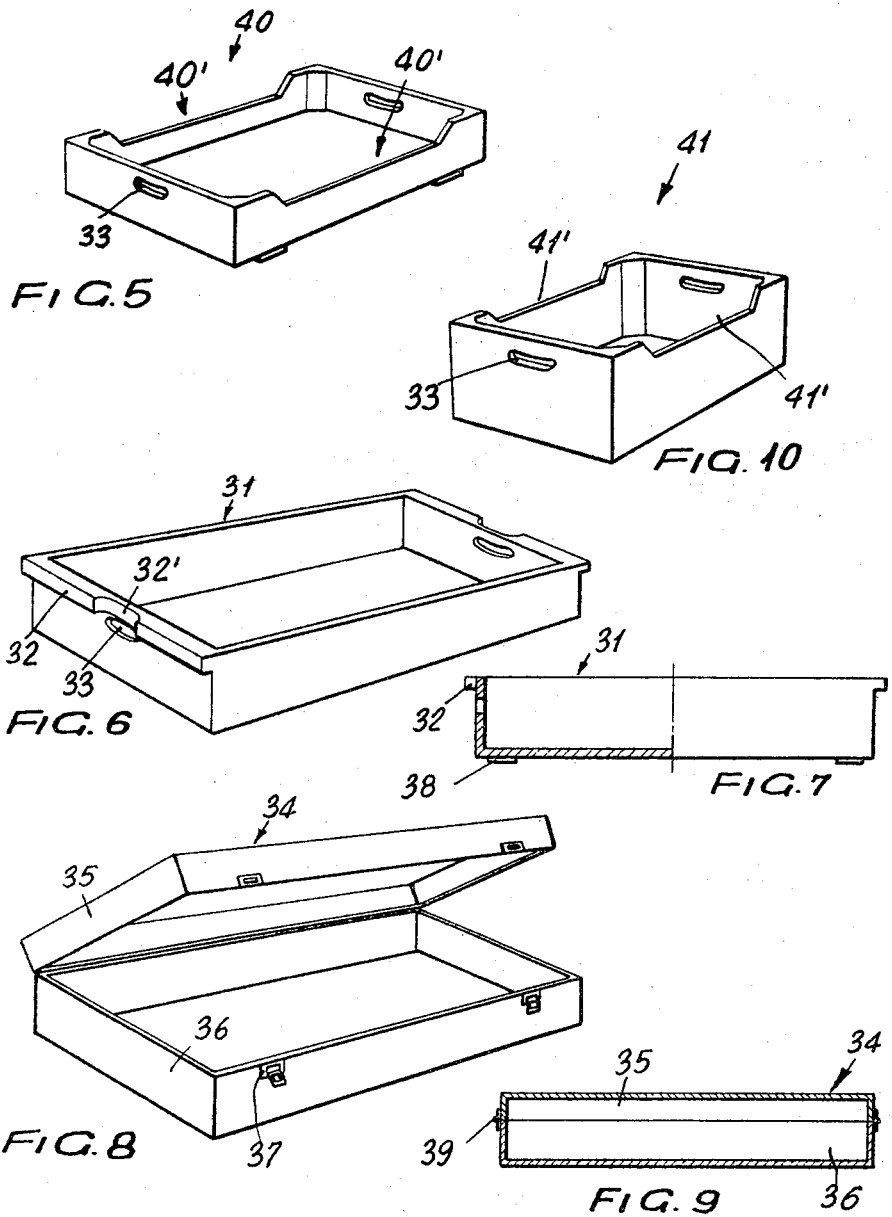

3,401,424
PRESS FOR STAMPING SHAVING AGGLOMERATE CONTAINERS, PROCESS RELATED THERETO AND CONTAINERS THUS OBTAINED
Adriano Gionco, Arcade, Treviso, Italy
(Via Fonfa 10, Spresiano, Treviso, Italy)
Filed Nov. 2, 1965, Ser. No. 506,040
Claims priority, application Italy, Oct. 26, 1965,
Patent 731,706
4 Claims. (Cl. 18—16)

ABSTRACT OF THE DISCLOSURE

A molding press for molding containers from shaving agglomerate, the press comprising a work table on which a mandrel is mounted. A first cylinder assembly is supported above the mandrel for movement along a first axis toward and away from the mandrel. A plurality of second cylinder assemblies are selectively adjustably supported on the work table for movement along second axes perpendicular to the first axis. Each of the first and second cylinder assemblies includes a die on the end thereof adjacent said mandrel, each die including a conduit through which heating fluid may be directed. Angle bars are selectively adjustably supported at each corner of the mandrel whereby the second cylinder assemblies and the angle bars may be adjusted in the plane of the work table to facilitate formation of varying container sizes.

---

The objects of the present invention are a press for stamping shaving agglomerate containers, a process related thereto and containers thus obtained.

Such containers may be obtained integral by stamping, or may be in a two-piece embodiment with equal plan dimensions, the two portions of which being connected to each other as hereinafter disclosed.

In both cases, the containers are solid, impact resistant, damp proof and of an excellent appearance.

It is to be noted that the material being used, i.e., wood shavings mixed with a thermosetting synthetic binder, is of a very low cost and particularly easy processing; as a result, the cost for the finished container is also low.

It will be further appreciated that the container is of very small thickness in connection with the dimensions thereof and that the same may be provided with internal stiffening ribs, in the meantime acting as partitions for the articles being arranged within said container.

The accompanying drawing shows some preferred embodiments of the press and container according to the invention, and namely:

FIGURE 5 is a perspective view of an integral container, particularly adapted for containing fruit;

FIGURES 6 and 7 are, respectively, a perspective view and a side view, partially in cross section, of an integral container, adapted for containing fruit or other things.

FIGURES 8 and 9 are, respectively, a perspective view and a cross sectional view of a two-piece container, particularly adapted for containing bottles.

FIGURE 10 is a perspective view of an integral container, adapted for containing bottles or other things.

Figure 1:
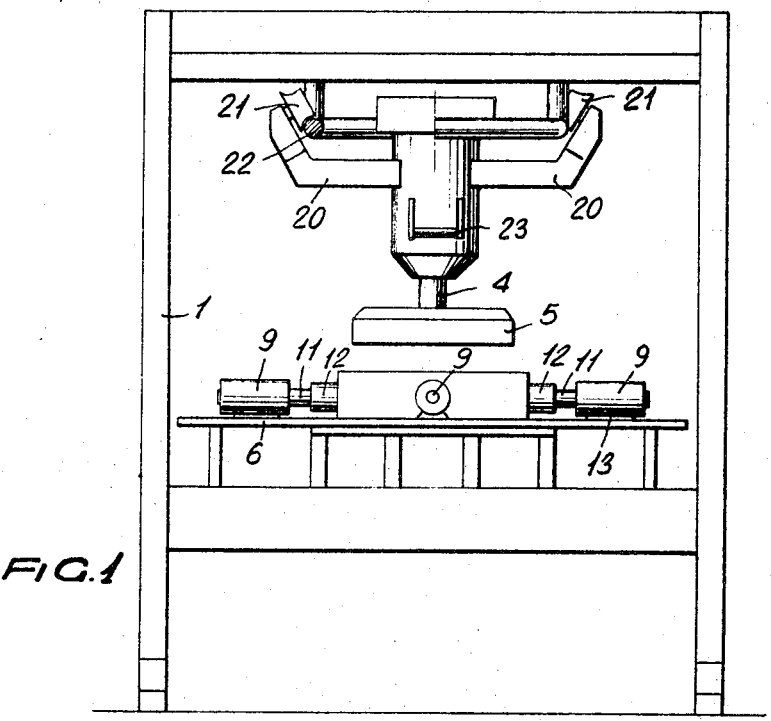
FIGURES 1 and 2 are a front view and a side view, respectively, of the press.
Figure 2:
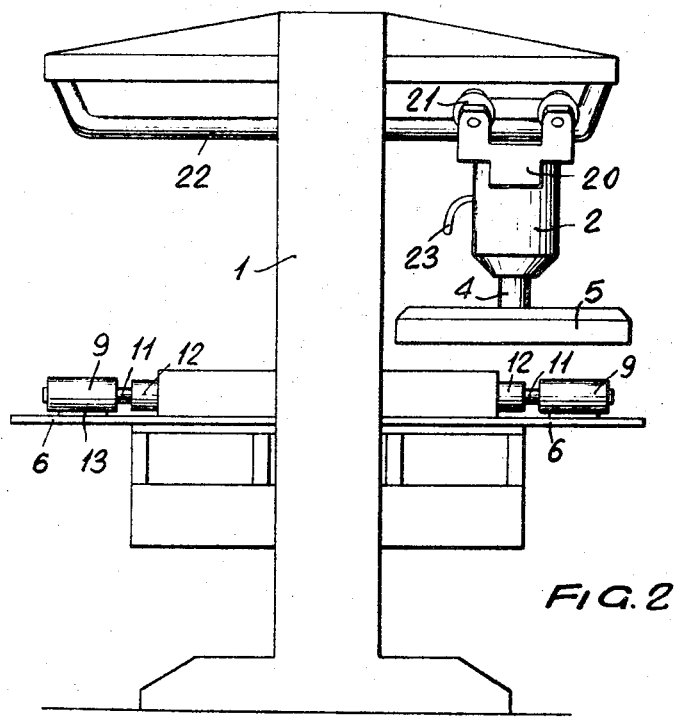
Figure 3:
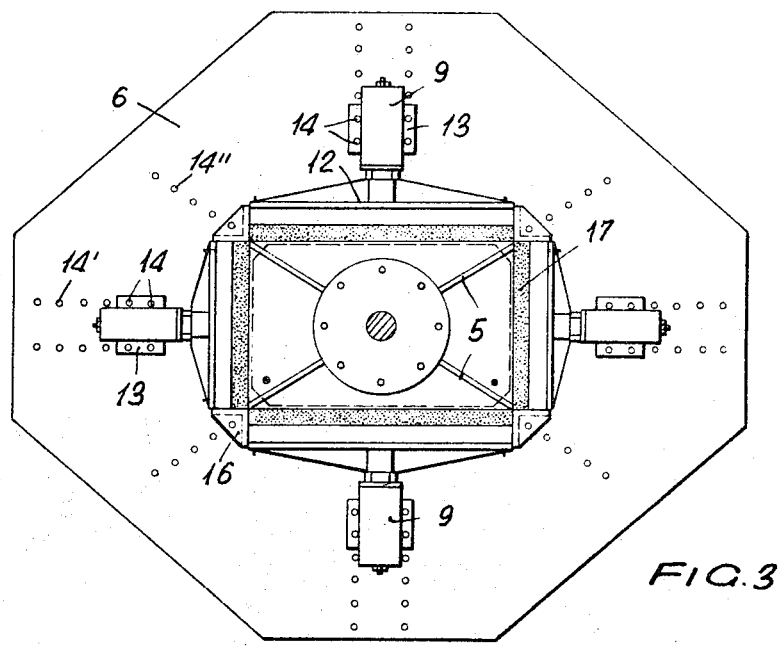
FIGURE 3 is a plan view of the work table for the press of FIGURES 1 and 2.

With particular reference to FIGURES 1, 2, 3, 4 and 5, it can be seen that the press of the present invention is a hydraulic press comprising a support frame indicated as a whole at 1, a cylinder 2 within which a piston is movable, the stem 4 of which carries on the lower part a preferably quadrilateral plan die 5.

Cylinder 2 is carried through two shaped arms 20 by two pairs of rollers 21, said rollers being provided with grooves and slidable on two circular cross section guide rails 22 integral with the support frame at the top thereof and perpendicular to the press front. The cylinder is provided with a handle 23, by virtue of which it can be drawn or pushed along rails 22.

In addition, the press includes a work table 6 for supporting a preferably quadrilateral plan mandrel or form 7 in any suitable manner clamped thereto, as well as four cylinders 9, the axes of which are parallel to table 6 and two by two oppositely arranged on two lines perpendicular to each other.

A hydraulically driven piston slides within each cylinder 9, the stem 11 of said piston carrying, as hereinafter more fully disclosed, a pressure plane or die 12 perpendicular thereto; thus, the four planes 12 being opposite two by two and suitable for clamping against the four side faces of mandrel 7.

Each cylinder 9 is carried by a support 13 that is attachable to work table 6 by four coach screws 14. Both die 5 and mandrel 7 are provided with a cavity divided by a plurality of vertical baffles 15 and 15′, respectively, forming a coil or conduit within which a hot fluid, preferably steam, circulates. A hot fluid, preferably steam, also circulates within cavities 12′ of each pressure plane 12.

For sake of simplicity, the flexible inlet and exhaust tubes for the hot fluid have not been shown in the figures, as well as the supply and exhaust conduits of the hydraulic cylinders, onto which are inserted known controls, also not shown.

As pistons slide within cylinders 9, stroke of pressure planes 12 is laterally guided by angle bars 16, the edge of each of which being disposed at the vertical passing through an edge of die 5 and opposite to the vortex with respect to the corresponding angle of the die.

Adjacent to each angle bar there is provided a pneumatically driven ejector piston, for simplicity not shown in figure, said piston being arranged below the forming container and flush with the work table, and, on raising, acting to eject the container on completion thereof.

It is to be noted that pressure planes 12 may be shaped so as to carry out container walls also shaped and/or inclined at will. The die and mandrel may also be suitably shaped so as to give whatever form to the bottom of the container with eventual grooves and/or projections.

Figure 4:
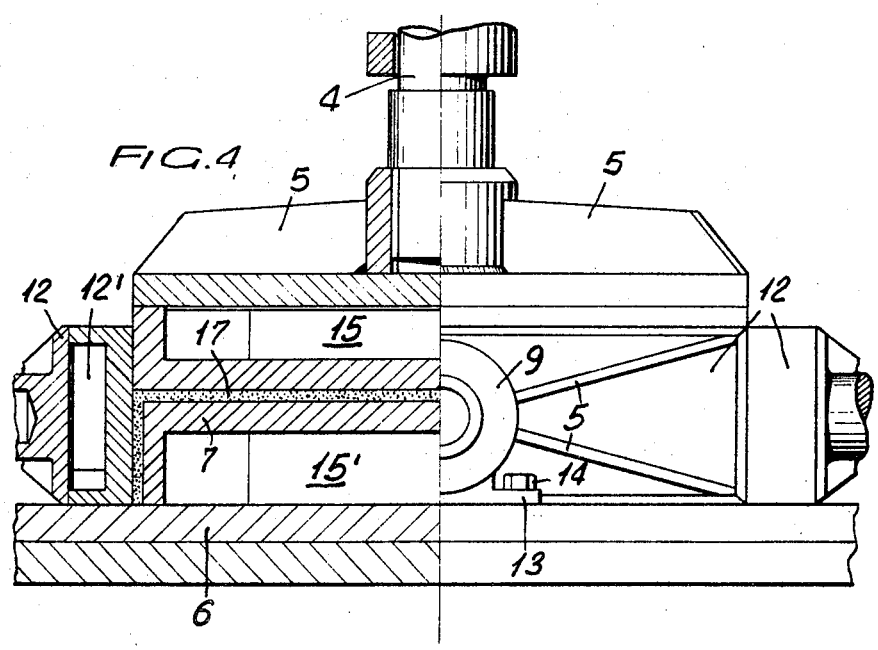
FIGURE 4 is a median sectional view showing a detail of the press of FIGURES 1, 2 and 3 with the parts thereof at a position of pressure end.

FIGURE 4 shows how the integral containers are stamped by the press of the present invention and the process to be hereinafter described. The mixture 17 of shavings, preferably wood shavings, and thermosetting resins is pressed between die 5 and mandrel 7 to form the bottom of the container, while being pressed between mandrel 7 and side pressure planes 12 to form the side walls of the container.

In order to carry out different sized containers by means of the same press provisions are made as follows:

Cylinders 9 can be moved along lines onto which axes thereof lie, and pressure planes 12 can be changed at the end of stems carrying the same owing to preferably dovetail joints.

Die 5 and mandrel 7 can be similarly changed in correspondence with the change of pressure planes 12.

Angle bars 16 can be displaced particularly with edges thereof along lines forming the extension of the diagonals of mandrel 7, and more generally at any position on work table 6, provided that side guides are always thereby formed in connection with pressure planes.

When not being utilized, holes 14' in work table 6 for fastening cylinders 9 through supports 13 thereof, and holes 14" for fastening angle bars 16, are covered by mandrel 7, or in whatever manner closed.

As above stated, the holes provided for the ejector pistons, not shown in figure, are similarly closed, only the holes through which the ejector pistons are in turn employed being left opened.

The process, also forming the object of the present invention and according to which the above described press is used, comprises the following steps:

(1) A mixture of wood shavings and a binder formed of a thermosetting resin is prepared.

(2) A suitable amount of said mixture is poured on the mandrel and between the side pressure planes and mandrel whilst the die, carried by the cylinder-piston assembly, is held spaced apart from the mandrel vertical.

(3) By means of the cylinder-piston units on the work table, the mixture is pressed between the side pressure planes and mandrel.

(4) The die is brought onto the mandrel vertical by causing the cylinder-piston assembly carrying the same to slide along the guide rails, and the mixture is pressed causing the piston to slide within the cylinder.

(5) The mixture is kept under pressure for a predetermined period, during which the circulation of the heating fluid is maintained within the several parts of the assembly.

(6) The die is lifted by operation on its cylinder-piston assembly and the side pressure or thrust planes are moved away from mandrel by operation on the relative cylinder-piston assemblies, and the so carried out container is lifted through the pneumatic ejectors.

In case of composite containers, the above described process is continued according to the following step:

(7) Two containers are moved to each other, so that the edges of one of them will mate with the edges of the other, and the side of one container is connected with the side of the other container by means of two hinges being introduced by pressure in any suitable manner.

FIGURES 6 and 7 show an integral container 31 carried out by the above described process. Said container is in the form of a box adapted for containing fruit or other things; in it, there can be seen the projecting edges 32 with the receding regions 32' obtained by suitably shaping the corresponding pressure planes of the die, and there can also be seen the windows 33 allowing the box itself to be raised. If desired, said windows may be carried out by providing corresponding projections on the side thrust planes. Externally, the bottom carries projections in the form of feet 38.

FIGURE 5 shows an integral box-like container 40, particularly adapted for containing fruit; in it there can be seen not only the windows 33 on two opposite sides, but also the central zones of reduced height 40' obtained by suitably shaping the corresponding side thrust planes.

FIGURES 8 and 9 show a box-like container 34 obtained in two pieces carried out by the above described process.

Box 34, particularly adapted to contain bottles, is therefore formed of two containers 35 and 36 having equal plan dimensions, connected to each other by hinging the side of one container on the corresponding side of the other container with hinges 39, and by providing the opposite sides with suitable locking devices 37. The two containers 35 and 36 may be of equal or different cavity as to depth, and form the bottom and cover for box 34, respectively.

FIGURE 10 shows an integral very deep box-like container 41, adapted for containing bottles or other things; in it there can be seen not only the windows 33 on two opposite sides but also the central zones of reduced height 41' obtained by suitably shaping the corresponding side thrust planes.

Bottoms of box 31, 34, 40 and 41 may have internal stiffening ribs, acting in the meantime as partitions for what is being arranged within the box.

Changes and variations may be made to what is the object of the present invention, without departing for this from the protective field of the present invention.

Particularly, the containers may have any number of side faces, and whatever may be, as well, the number of cylinder-piston assemblies carried by the work table.

I claim:

1. A hydraulic press for stamping shaving agglomerate containers, comprising on a suitable support frame: a first cylinder, within which a hydraulically driven piston is slidably mounted, the stem of said piston carrying a die; a work table adapted to support a mandrel and a plurality of second cylinders, having the axes thereof parallel to said said table, and perpendicular to said first cylinder and within each of which a hydraulically driven piston is slidably mounted, the stem of each of said pistons carrying at the end thereof a pressure plane, said pressure planes being adapted to clamp against the side faces of said mandrel, both said die and mandrel further including a cavity within which a hot fluid, preferably steam is adapted to circulate, the stroke of said pressure planes being laterally guided by angle bars, the edge of each of which is disposed at the vertical passing through an edge of the die, and opposite to the vertex with respect to the corresponding angle of said die.

2. A hydraulic press according to claim 1 wherein said second cylinders are adapted to be moved along the axes thereof, said pressure planes and said stems including a dovetail joint therebetween, said die and mandrel adapted to be moved in correspondence with said pressure planes, and said angle bars adapted to be displaced along lines forming the extension of mandrel diagonals.

3. A molding press comprising:
a support frame;
a work table supported on said frame having a mandrel thereon;
a first power cylinder assembly supported on said frame and including a die movable along a first axis toward and away from said mandrel;
a plurality of second power cylinder assemblies, each including a cylinder adjustably supported on said work table, each of said second cylinder assemblies including a pressure plane movable along a second axis perpendicular to said first axis for cooperating with said die and said mandrel to form a mold; said work table including a plurality of adjustment means for selective adjustment of each of said cylinders on said work table along said second axes toward and away from said mandrel.

4. A molding press according to claim 3 wherein said mandrel is rectangular in form and further including angle bars supported at each corner of said mandrel, said work table further including second adjustment means for selective adjustment of each of said angle bars along third axes diagonal to said second axes.

References Cited

UNITED STATES PATENTS

| | | | |
|---|---|---|---|
| 1,207,673 | 12/1916 | Willard | 18—19 |
| 1,352,160 | 9/1920 | Willard | 18—19 |
| 1,421,748 | 7/1922 | Willard | 18—19 |
| 2,043,366 | 5/1936 | Beck | 25—45 |
| 2,867,002 | 1/1959 | Zalozeck | 25—45 |
| 1,630,157 | 5/1927 | Ahlgren et al. | 18—19 |

WILLIAM J. STEPHENSON, *Primary Examiner.*